United States Patent
Qi et al.

(10) Patent No.: US 10,798,555 B2
(45) Date of Patent: Oct. 6, 2020

(54) NEIGHBOR AWARENESS NETWORKING IN DYNAMIC FREQUENCY SELECTION CHANNELS

(71) Applicant: Intel IP Corporation, Santa Clara, CA (US)

(72) Inventors: Emily H. Qi, Gig Harbor, WA (US); Po-Kai Huang, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/398,998

(22) Filed: Apr. 30, 2019

(65) Prior Publication Data
US 2019/0335311 A1 Oct. 31, 2019

Related U.S. Application Data

(63) Continuation of application No. 15/607,164, filed on May 26, 2017, now Pat. No. 10,321,296.
(Continued)

(51) Int. Cl.
*H04L 5/00* (2006.01)
*H04L 29/08* (2006.01)
(Continued)

(52) U.S. Cl.
CPC ........... *H04W 8/005* (2013.01); *H04L 5/0092* (2013.01); *H04L 5/0094* (2013.01); *H04L 67/16* (2013.01);
(Continued)

(58) Field of Classification Search
CPC ........ H04J 1/02; H04J 1/16; H04J 3/02; H04J 3/14; H04L 5/0001–0046; H04L 5/0091–12; H04L 45/20; H04L 67/104–1093; H04W 4/02–029; H04W 4/06; H04W 4/08; H04W 4/20–23; H04W 4/70; H04W 4/80; H04W 8/005; H04W 8/22–245; H04W 28/0247; H04W 28/10–14; H04W 40/02; H04W 40/24–38; H04W 48/16; H04W 48/18; H04W 56/001–0025; H04W 64/003;
(Continued)

(56) References Cited

U.S. PATENT DOCUMENTS

| 10,321,296 B2 | 6/2019 | Qi et al. |
| 2015/0351114 A1 | 12/2015 | Wolf et al. |

(Continued)

OTHER PUBLICATIONS

"U.S. Appl. No. 15/607,164, Non Final Office Action dated Aug. 9, 2018", 20 pgs.
(Continued)

*Primary Examiner* — Timothy J Weidner
(74) *Attorney, Agent, or Firm* — Schwegman Lundberg & Woessner, P.A.

(57) ABSTRACT

Described herein are mechanisms to inform a first Neighbor Awareness Networking (NAN) device as to whether or not a second NAN device is connected to a dynamic frequency selection (DFS) master and/or whether the second NAN device is listening to the same DFS master as the first NAN device. In order for NAN client devices to operate in the 5 GHz band and be DFS compliant, all such devices that are communicating in a NAN peer-to-peer manner must either maintain association with a DFS master or must listen to the same DFS master for channel information.

20 Claims, 8 Drawing Sheets

| FIELD | SIZE (OCTETS) | VALUE | DESCRIPTION |
|---|---|---|---|
| DEVICE ROLE | 1 | VARIABLE | IDENTIFIES THE DEVICE ROLE OR STATUS. VALUE "0": INDICATES THAT THE DEVICE IS A DFS MASTER. VALUE "1": INDICATES THAT THE DEVICE IS ASSOCIATED/CONNECTED WITH A DFS MASTER DEVICE. VALUE "2": INDICATES THAT THE DEVICE LISTENS TO A DFS MASTER DEVICE. VALUE 3 TO 255 ARE RESERVED. |
| MAC ADDRESS OF THE DFS MASTER DEVICE | 6 | VARIABLE | INDICATES THE MAC ADDRESS OF THE DFS MASTER DEVICE. |
| DFS CHANNEL AVAILABILITY | TBD | VARIABLE | ONE OR MORE AVAILABLE DFS CHANNELS OR A BITMAP TO INDICATE AVAILABLE DFS CHANNELS. IF THE DEVICE IS A DFS MASTER DEVICE, THIS FIELD INCLUDES A SET OF AVAILABLE DFS CHANNELS. IF THE DEVICE IS ASSOCIATED/CONNECTED/LISTENING TO A DFS MASTER DEVICE, THE FIELD ONLY INCLUDES THE DFS CHANNEL WHERE THE MASTER DEVICE IS OPERATING. |

Related U.S. Application Data

(60) Provisional application No. 62/402,477, filed on Sep. 30, 2016.

(51) Int. Cl.

| | | |
|---|---|---|
| *H04W 4/80* | (2018.01) | |
| *H04W 8/00* | (2009.01) | |
| *H04W 8/22* | (2009.01) | |
| *H04W 48/16* | (2009.01) | |
| *H04W 64/00* | (2009.01) | |
| *H04W 72/04* | (2009.01) | |
| *H04W 72/12* | (2009.01) | |
| *H04W 76/10* | (2018.01) | |
| *H04W 76/14* | (2018.01) | |
| *H04W 80/02* | (2009.01) | |
| *H04W 84/12* | (2009.01) | |
| *H04W 84/20* | (2009.01) | |

(52) U.S. Cl.
CPC ............... *H04W 4/80* (2018.02); *H04W 8/22* (2013.01); *H04W 48/16* (2013.01); *H04W 64/003* (2013.01); *H04W 72/0406* (2013.01); *H04W 72/1205* (2013.01); *H04W 72/1278* (2013.01); *H04W 76/10* (2018.02); *H04W 76/14* (2018.02); *H04W 80/02* (2013.01); *H04W 84/12* (2013.01); *H04W 84/20* (2013.01)

(58) Field of Classification Search
CPC ....... H04W 72/005–14; H04W 74/002; H04W 74/08; H04W 76/10–50; H04W 80/02; H04W 84/02; H04W 84/12; H04W 84/18–22; H04W 88/005–12; H04W 92/04; H04W 92/10; H04W 92/18; H04W 92/20
See application file for complete search history.

(56) References Cited

U.S. PATENT DOCUMENTS

| | | |
|---|---|---|
| 2016/0278112 A1 | 9/2016 | Liu et al. |
| 2017/0311171 A1 | 10/2017 | Kurian et al. |
| 2018/0098183 A1 | 4/2018 | Qi et al. |

OTHER PUBLICATIONS

"U.S. Appl. No. 15/607,164, Notice of Allowance dated Jan. 24, 2019", 6 pgs.
"U.S. Appl. No. 15/607,164, Response filed Nov. 9, 2018 to Non Final Office Action dated Aug. 9, 2018", 11 pgs.
"Wi-Fi Neighbor Awareness Networking (NAN) Technical Specification", Version 1.0 r07, (May 1, 2015), 1-156.
U.S. Appl. No. 15/607,164, filed May 26, 2017, Neighbor Awareness Networking in Dynamic Frequency Selection Channels, Qi et al., U.S. Pat. No. 10,321,296.

| FIELD | SIZE (OCTETS) | VALUE | DESCRIPTION |
|---|---|---|---|
| ATTRIBUTE ID | 1 | 0x0F | IDENTIFIES THE TYPE OF NAN ATTRIBUTE. |
| LENGTH | 2 | VARIABLE | LENGTH OF THE FOLLOWING FIELDS IN THE ATTRIBUTE. |
| ⋮ | ⋮ | ⋮ | ⋮ |
| CAPABILITIES | 1 | VARIABLE | BIT 0 (DFS MASTER): SET TO 1 INDICATES THAT THE DEVICE IS A DFS MASTER DEVICE. OTHERWISE, SET TO 0.<br><br>BIT 1 BIT 7: RESERVED. |
|  |  |  |  |

*Fig. 8*

| FIELD | SIZE (OCTETS) | VALUE | DESCRIPTION |
|---|---|---|---|
| ATTRIBUTE ID | 1 | TBD | IDENTIFIES THE TYPE OF NAN ATTRIBUTE. (DFS INFORMATION ATTRIBUTE) |
| LENGTH | 2 | VARIABLE | LENGTH OF THE FOLLOWING FIELDS IN THE ATTRIBUTE. |
| DFS INFORMATION ENTRIES | TBD | VARIABLE | A LIST OF DFS INFORMATION ENTRY FIELDS. |

*Fig. 9*

| FIELD | SIZE (OCTETS) | VALUE | DESCRIPTION |
|---|---|---|---|
| DEVICE ROLE | 1 | VARIABLE | IDENTIFIES THE DEVICE ROLE OR STATUS.<br><br>VALUE "0": INDICATES THAT THE DEVICE IS A DFS MASTER.<br><br>VALUE "1": INDICATES THAT THE DEVICE IS ASSOCIATED/ CONNECTED WITH A DFS MASTER DEVICE.<br><br>VALUE "2": INDICATES THAT THE DEVICE LISTENS TO A DFS MASTER DEVICE.<br><br>VALUE 3 TO 255 ARE RESERVED. |
| MAC ADDRESS OF THE DFS MASTER DEVICE | 6 | VARIABLE | INDICATES THE MAC ADDRESS OF THE DFS MASTER DEVICE. |
| DFS CHANNEL AVAILABILITY | TBD | VARIABLE | ONE OR MORE AVAILABLE DFS CHANNELS OR A BITMAP TO INDICATE AVAILABLE DFS CHANNELS.<br><br>IF THE DEVICE IS A DFS MASTER DEVICE, THIS FIELD INCLUDES A SET OF AVAILABLE DFS CHANNELS.<br><br>IF THE DEVICE IS ASSOCIATED/CONNECTED/LISTENING TO A DFS MASTER DEVICE, THE FIELD ONLY INCLUDES THE DFS CHANNEL WHERE THE MASTER DEVICE IS OPERATING. |

*Fig. 10*

NEIGHBOR AWARENESS NETWORKING IN DYNAMIC FREQUENCY SELECTION CHANNELS

PRIORITY CLAIM

This application is a continuation of U.S. patent application Ser. No. 15/607,164, filed May 26, 2017, which claims priority to U.S. Provisional Patent Application Ser. No. 62/402,477 filed. Sep. 30, 2016, each of which are incorporated herein by reference in their entirety

TECHNICAL FIELD

Embodiments described herein relate generally to wireless networks and communications systems.

BACKGROUND

Wireless networking based on the Wi-Fi IEEE 802.11 standards is one of the most widely adopted wireless technologies. An 802.11 network may be based on a star topology with two types of wireless devices: clients and access points (APs), both of which may be referred to as stations (STAs). Access points (APs) provide an infrastructure function by communicating directly with client devices and linking them to other networks such as the internet. APs may also link a client device to another client device. Technologies have also been developed to enable a client device to communicate directly with another client device in a peer-to-peer manner without going through an AP. One such technology is Neighbor Awareness Networking (NAN), also called Wi-Fi Aware. NAN is a power efficient and scalable peer-to-peer technology that enables Wi-Fi devices to discover devices and/or services in their close proximity and setup NAN operations with peer devices. Such NAN operations include data path and ranging operations that may occur at scheduled time slots and frequency channels.

The 802.11 standards provide service over two frequency bands, 2.4 GHz and 5 GHz. The 2.4 GHz band is approximately 80 MHz in width and allows no more than three non-overlapping channels. The 5 GHz band provides between two and seven times the number of channels and resulting network capacity as the 2.4 GHz band. In most countries, however, portions of the 5 GHz band also are used by weather and military radar systems that have priority over Wi-Fi devices. In order to coexist with these critical systems, Wi-Fi radios must comply with Dynamic Frequency Selection (DFS) as defined by an 801.11 specification. Compliance with DFS is required for both infrastructure and client devices operating in the 5 GHz band. NAN operations in the 5 GHz band in compliance with DFS are concerns of the present disclosure.

BRIEF DESCRIPTION OF THE DRAWINGS

FIG. 8 is a table illustrating the device capability attribute fields of a NAN service discovery frame according to one embodiment.

FIG. 9 is a table of the fields of a DFS information attribute according to some embodiments FIG. 10 is a table of the fields of an example DFS information entry according to some embodiments

DETAILED DESCRIPTION

In order for STAs to communicate over the unlicensed 5 GHz band and comply with DFS, at least one of the devices must be what is called a DFS master with radar detection capability. For example, an AP that controls client devices in a wireless network and configured to operate in the 5 GHz band is required to be a DFS master. Before transmitting on a DFS channel, the AP must first listen for the presence of radar signals. If radar is detected, the channel must be vacated and flagged as unavailable. The AP continues to monitor for the presence of radar during operation and, if radar is detected, must move to an unoccupied channel and instruct all associated client devices to move also. Client devices are not allowed to transmit on a DFS channel unless instructed by a DFS master that the channel is free from radar.

In order for NAN devices to operate in the 5 GHz band and be DFS compliant, all such devices that are communicating in a NAN peer-to-peer manner must either be a DFS master, maintain association with a DFS master or must listen to the same DFS master for channel information. In either case, the NAN devices vacate or utilize DFS channels in accordance with instructions from the DFS master. Described herein are mechanisms to inform a first NAN device as to whether or not a second NAN device is a DFS master, whether the second NAN device is connected to a DFS master, and/or whether the second NAN device is listening to the same DFS master as the first NAN device.

Example Radio Architecture

Figure 1:
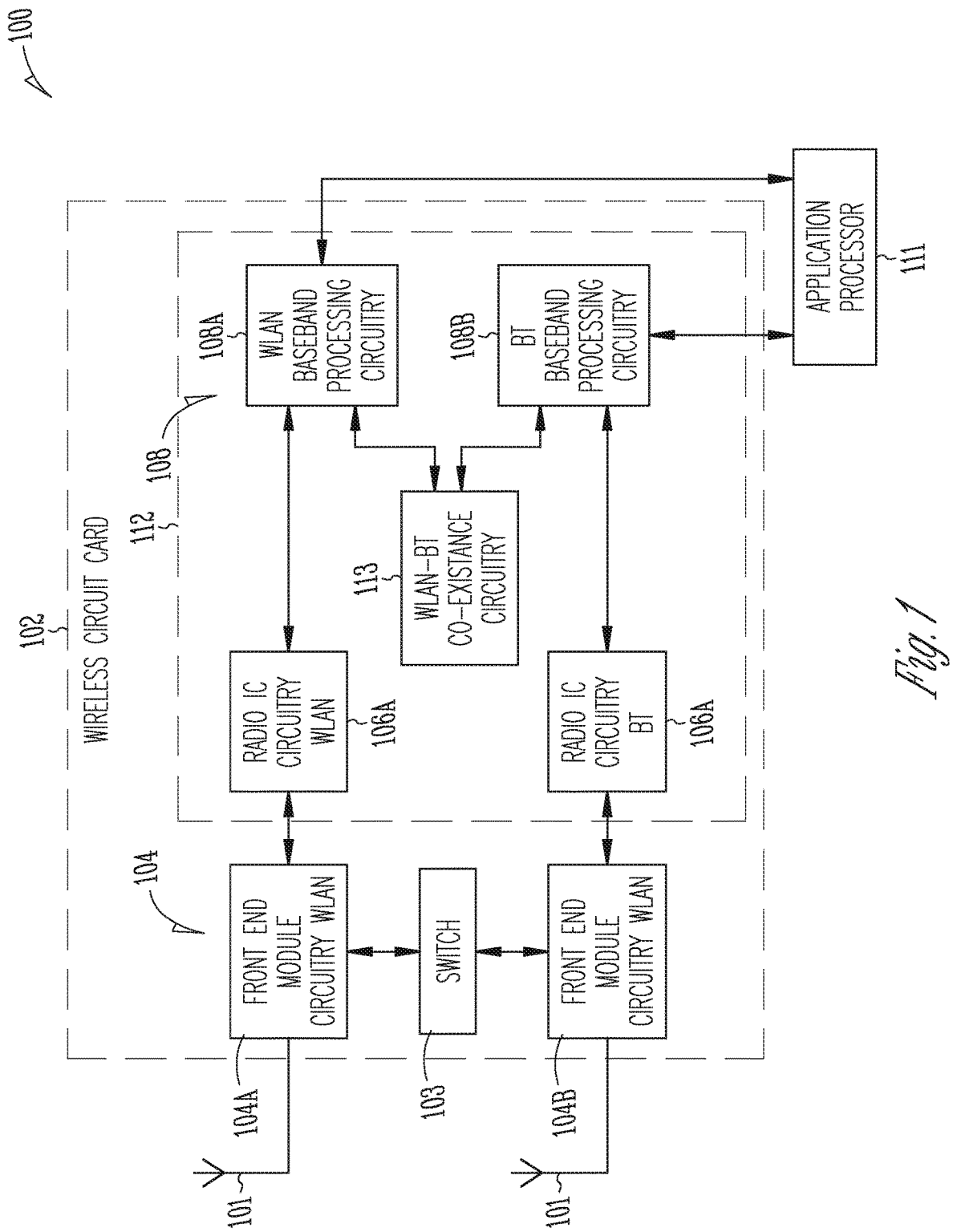
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEW circuitry 104 may include a WLAN or Wi-Fi FEM circuitry 104*a* and a Bluetooth (BT) FEM circuitry 104*b*. The WLAN FEM circuitry 104*a* may include a receive signal path comprising circuitry configured to operate on WLAN RF signals received from one or more antennas 101, to amplify the received signals and to provide the amplified versions of the received signals to the WLAN radio IC circuitry 106*a* for further processing. The BT FEM circuitry 104*b* may include a receive signal path which may include circuitry configured to operate on BT RF signals received from one or more antennas 102, to amplify the received signals and to provide the amplified versions of the received signals to the BT radio IC circuitry 106b for further processing. FEM circuitry 104a may also include a transmit signal path which may include circuitry configured to amplify WLAN signals provided by the radio IC circuitry 106a for wireless transmission by one or more of the antennas 101. In addition, FEM circuitry 104b may also include a transmit signal path which may include circuitry configured to amplify BT signals provided by the radio IC circuitry 106b for wireless transmission by the one or more antennas. In the embodiment of FIG. 1, although FEM 104a and FEM 104b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106a and BT radio IC circuitry 106b. The WLAN radio IC circuitry 106a may include a receive signal path which may include circuitry to down-convert WLAN RF signals received from the FEM circuitry 104a and provide baseband signals to WLAN baseband processing circuitry 108a. BT radio IC circuitry 106b may in turn include a receive signal path which may include circuitry to down-convert BT RF signals received from the FEM circuitry 104b and provide baseband signals to BT baseband processing circuitry 108b. WLAN radio IC circuitry 106a may also include a transmit signal path which may include circuitry to up-convert WLAN baseband signals provided by the WLAN baseband processing circuitry 108a and provide WLAN RF output signals to the FEM circuitry 104a for subsequent wireless transmission by the one or more antennas 101. BT radio IC circuitry 106b may also include a transmit signal path which may include circuitry to up-convert BT baseband signals provided by the BT baseband processing circuitry 108b and provide BT RF output signals to the FEM circuitry 104b for subsequent wireless transmission by the one or more antennas 101. In the embodiment of FIG. 1, although radio IC circuitries 106a and 106b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108a and a BT baseband processing circuitry 108b. The WLAN baseband processing circuitry 108a may include a memory, such as, for example, a set of RAM arrays in a Fast Fourier Transform or Inverse Fast Fourier Transform block (not shown) of the WLAN baseband processing circuitry 108a. Each of the WLAN baseband circuitry 108a and the BT baseband circuitry 108b may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108a and 108b may further include physical layer (PHY) and medium access control layer (MAC) circuitry, and may further interface with application processor 110 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108a and the BT baseband circuitry 108b to enable use cases requiring WLAN and BT coexistence. In addition, a switch 103 may be provided between the WLAN FEM circuitry 104a and the BT FEM circuitry 104b to allow switching between the WLAN and BT radios according to application needs. In addition, although the antennas 101 are depicted as being respectively connected to the WLAN FEM circuitry 104a and the BT FEM circuitry 104b, embodiments include within their scope the sharing of one or more antennas as between the WLAN and BT FEMs, or the provision of more than one antenna connected to each of FEM 104a or 104b.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, and/or 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108b may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
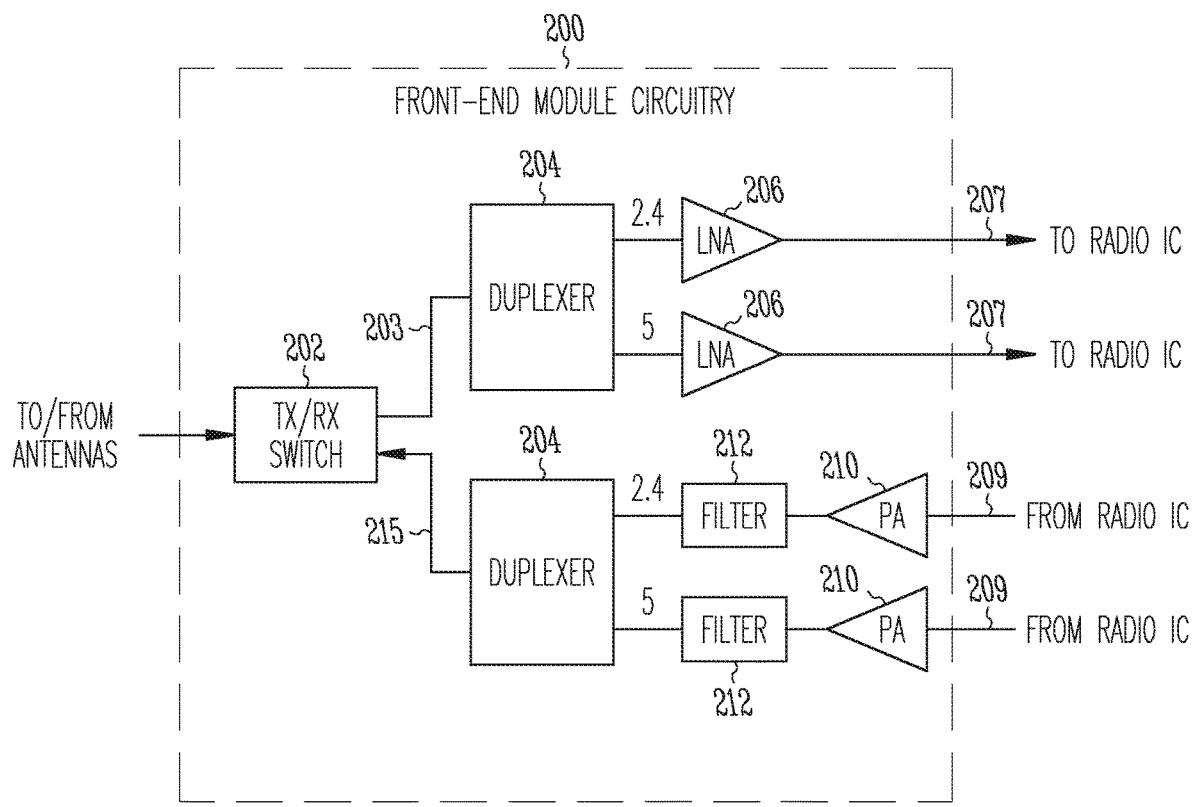
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104a/104b (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
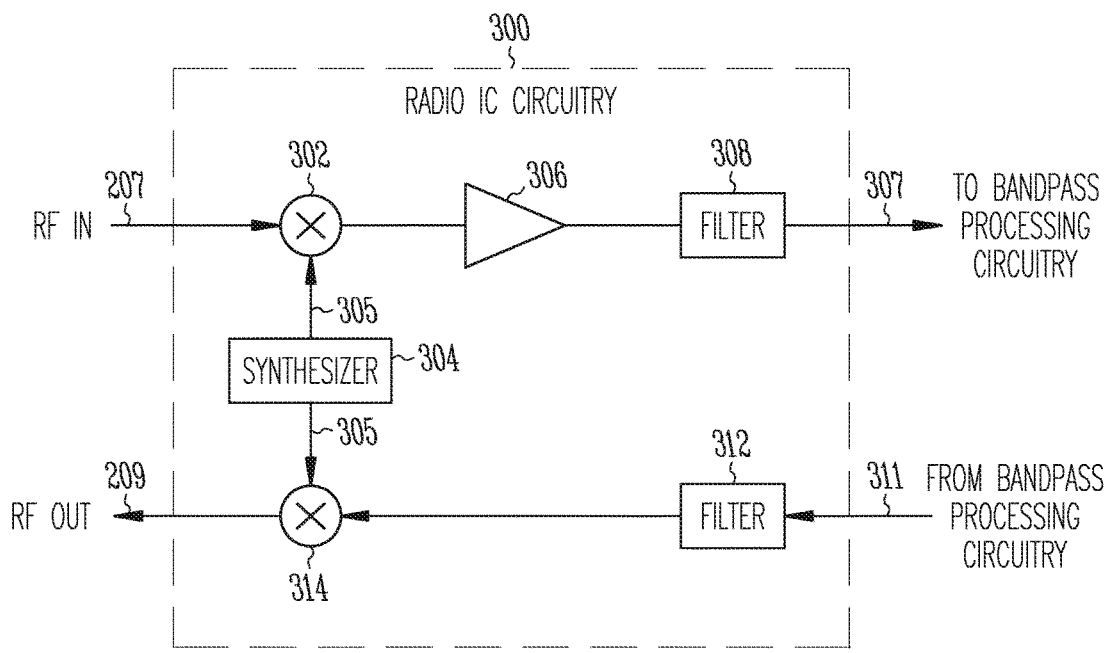
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106a/106b (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage-controlled oscillator (VCO), although that is not a requirement. A divider control input may further be provided by either the baseband processing circuitry 108 (FIG. 1) or the application processor 110 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 110.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
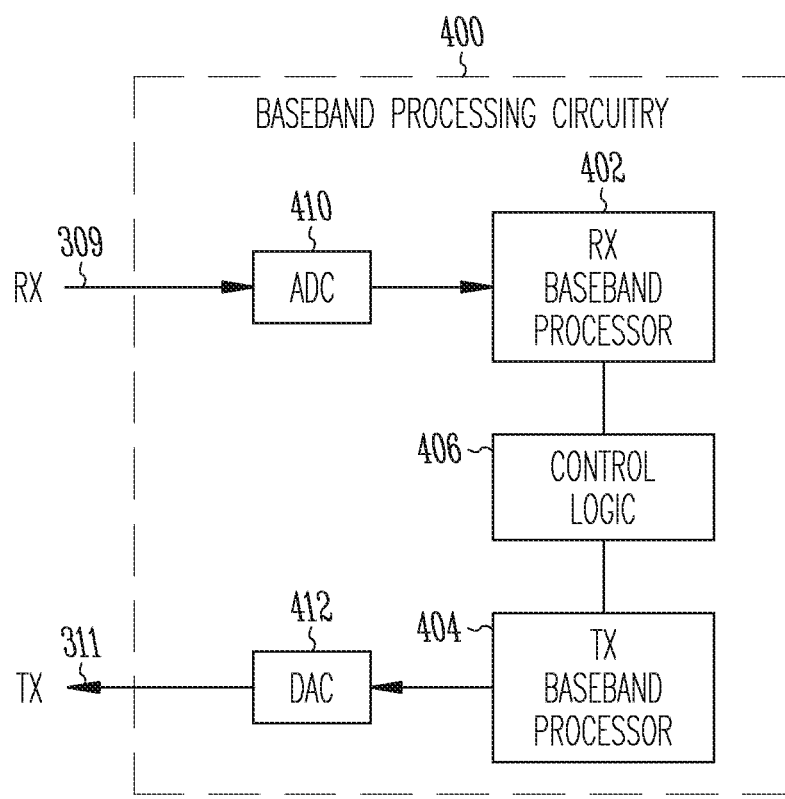
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108a, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a pre-amble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Example Machine Description

Figure 5:
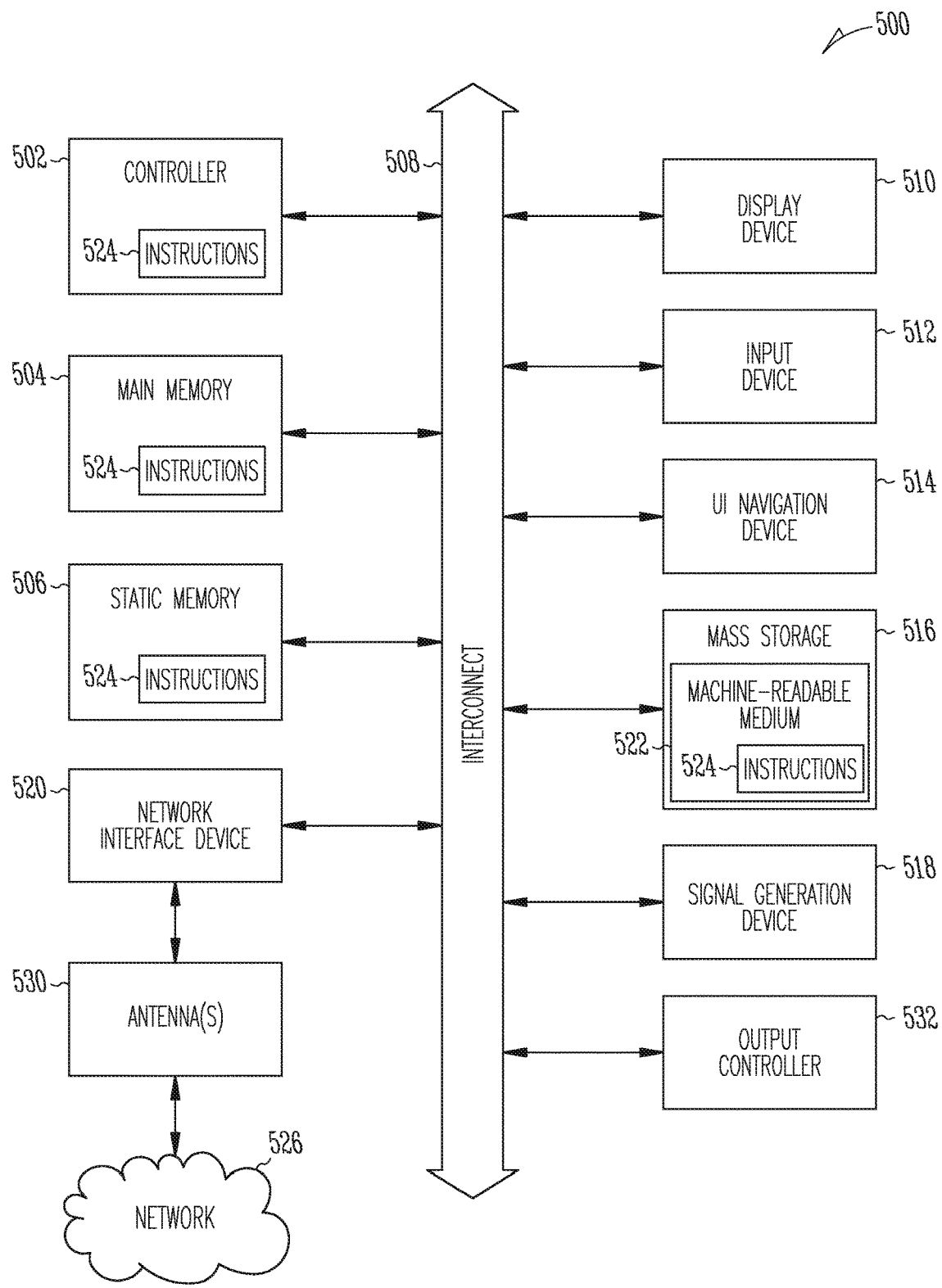
FIG. 5 illustrates an example of a computing machine according to some embodiments.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a user equipment (UE), evolved Node B (eNB), Wi-Fi access point (AP), Wi-Fi station (STA), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, interact protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques. The term "transmission medium" shall be taken to include any intangible medium that is capable of storing, encoding, or carrying instructions for execution by the machine 500, and includes digital or analog communications signals or other intangible medium to facilitate communication of such software.

Example STA Description

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 6:
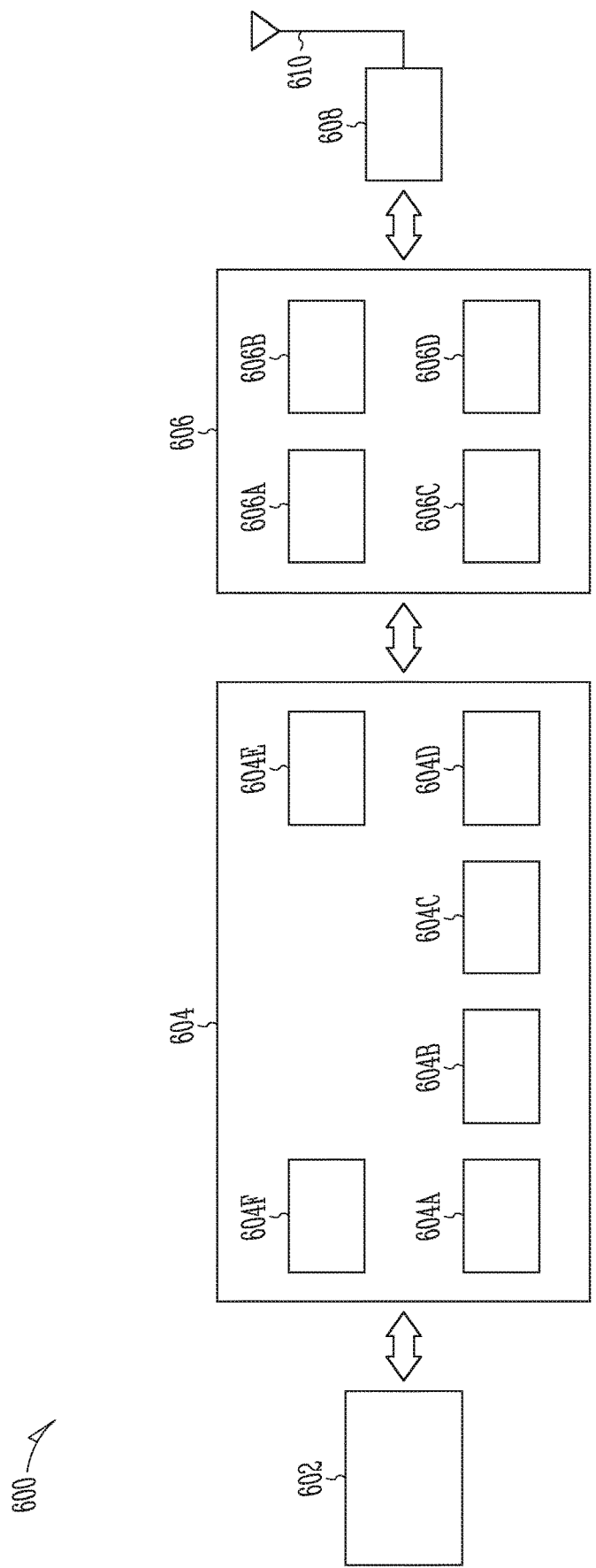
FIG. 6 illustrates an example of a wireless station device according to some embodiments.

Embodiments described herein may be implemented into a system using any suitably configured hardware and/or software. FIG. 6 illustrates, for one embodiment, example components of a STA or User Equipment (UE) device 600. In some embodiments, the STA device 600 may include application circuitry 602, baseband circuitry 604, Radio Frequency (RF) circuitry 606, front-end module (FEM) circuitry 608 and one or more antennas 610, coupled together at least as shown.

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 604 may include circuitry such as, but not limited to, one or more single-core or multi-core processors. The baseband circuitry 604 may include one or more baseband processors and/or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a second generation (2G) baseband processor 604a, third generation (3G) baseband processor 604b, fourth generation (4G) baseband processor 604c, and/or other baseband processor(s) 604d for other existing generations, generations in development or to be developed in the future (e.g., fifth generation (5G), 6G, etc.). The baseband circuitry 604 (e.g., one or more of baseband processors 604a-d) may handle various radio control functions that enable communication with one or more radio networks via the RF circuitry 606. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, and/or constellation mapping/demapping functionality. In some embodiments, encoding/decoding circuitry of the baseband circuitry 604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 604e of the baseband circuitry 604 may be configured to run elements of the protocol stack for signaling of the PHY, MAC, RLC, PDCP and/or RRC layers. In some embodiments, the baseband circuitry may include one or more audio digital signal processor(s) (DSP) 604f. The audio DSP(s) 604f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the RF circuitry 606 may include a receive signal path and a transmit signal path. The receive signal path of the RF circuitry 606 may include mixer circuitry 606a, amplifier circuitry 606b and filter circuitry 606c. The transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c. The filter circuitry 606c may include a low-pass filter (LPF), although the scope of the embodiments is not limited in this respect.

In some embodiments, the mixer circuitry 606a of the receive signal path and the mixer circuitry 606a of the transmit signal path may include two or more mixers and may be arranged for quadrature downconversion and/or upconversion respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct downconversion and/or direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610.

In some embodiments, the FEM circuitry 608 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610.

In some embodiments, the UE device 600 may include additional elements such as, for example, memory/storage, display, camera, sensor, and/or input/output (I/O) interface.

DESCRIPTION OF EMBODIMENTS

Figure 7:
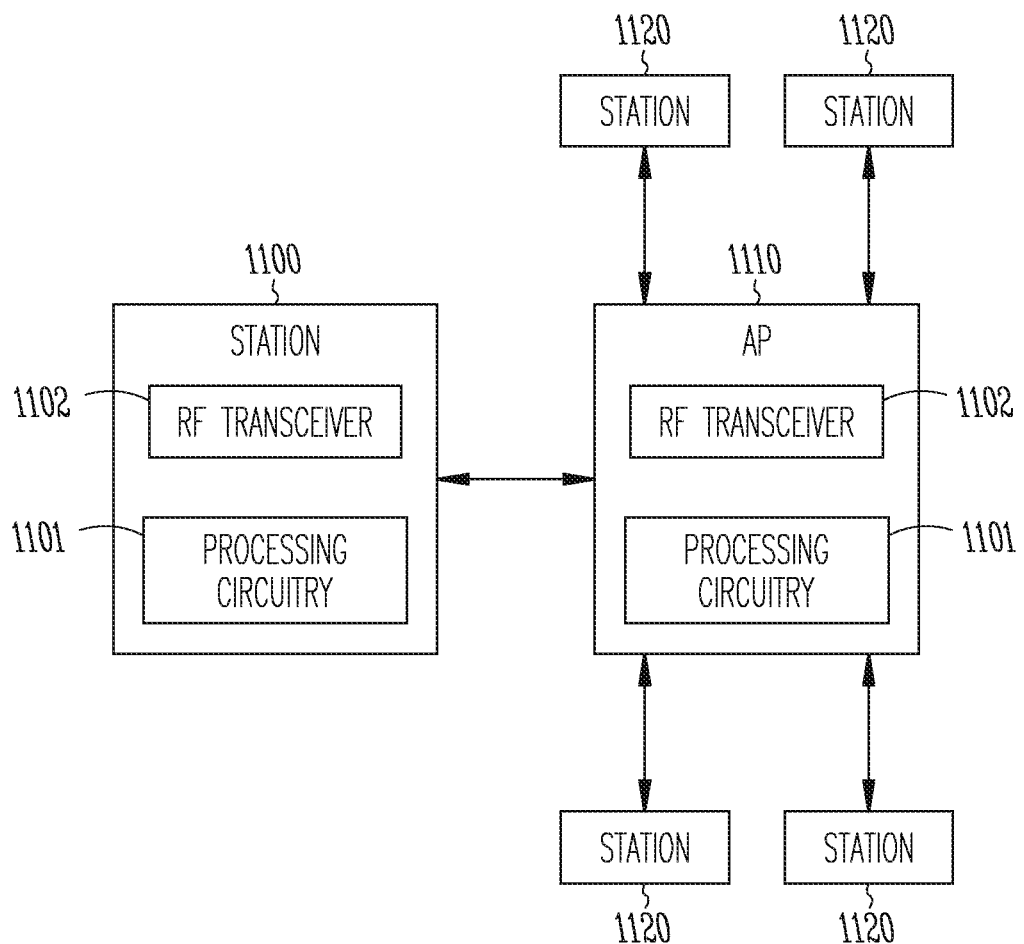
FIG. 7 illustrates a basic service set that includes station devices associated with an access point according to some embodiments.

In an 802.11 local area network (LAN), the entities that wirelessly communicate are referred to as stations (STAs). A basic service set (BSS) refers to a plurality of stations that remain within a certain coverage area and form some sort of association. In one form of association, the stations communicate directly with one another in an ad-hoc network. More typically, however, the stations associate with a central station dedicated to managing the BSS and referred to as an access point (AP). FIG. 7 illustrates a BSS that includes a station device 1100 associated with an access point (AP) 1110, where the AP 1110 may be associated with a number of other stations 1120. The device 1100 may be any type of device with functionality for connecting to a WiFi network such as a computer, smart phone, or a UT (user equipment) with WLAN access capability, the latter referring to terminals in a LTE (Long Term Evolution) network. Each of the station devices include an RF (radio frequency transceiver) 1102 and processing circuitry 1101 as shown by the depictions of devices 1100 and 1110. The processing circuitry includes the functionalities for WiFi network access via the RF transceiver as well as functionalities for processing as described herein. The RF transceivers of the station device 1100 and access point 1110 may each incorporate one or more antennas. The RF transceiver 1100 with multiple antennas and processing circuitry 101 may implement one or more MEM (multi-input multi-output) techniques such as spatial multiplexing, transmit/receive diversity, and beam forming. The devices 1100 and 1110 are representative of the wireless access points and stations that may communicate using NAN operations as described below.

In an 802.11 WLAN network, the stations communicate via a layered protocol that includes a physical layer (PHY) and a medium access control (MAC) layer. The MAC layer is a set of rules that determine how to access the medium in order to send and receive data, and the details of transmission and reception are left to the PHY layer. At the MAC layer, transmissions in an 802.11 network are in the form of MAC frames of which there are three main types: data frames, control frames, and management frames. What are referred to herein as NAN action frames are MAC frames that set up and manage NAN communications between NAN devices. Examples of NAN action frames include data path setup frames, schedule request frames, schedule response frames, and update notification frames.

In some embodiments described below, mechanisms are provided to allow a NAN device to communicate its DFS master functionality and/or whether it is connected with or listening to a DFS master. Using this information, NAN devices may update their committed NAN availability and then decide whether they can operate in a DFS channel or not. In some embodiments, a NAN device may provide indications and information as follows: 1) whether it supports DFS master functionality; 2) whether it has a connection/association with a DFS master device where the DFS master MAC address may be included in the NAN data path setup frame and schedule update frames; and/or 3) whether it can listen to a DFS master device where the DFS master MAC address may be included in the NAN data path setup frame and schedule update frames. If the NAN device supports DFS master functionality, the committed NAN availability in the DFS channels should be updated in real time according to radar detection and DFS master operation rules. If the NAN device connects/associates/listens to a DFS master, the committed NAN availability slots in the DFS channels may be required to be the same or a subset of the DFS master's committed availability in the DFS channels.

FIG. 8 is a table illustrating the device capability attribute fields of a NAN service discovery frame according to one embodiment. The fields include an attribute identification (ID) field indicating the type of NAN attribute that in this case would be the device capability attribute, a length field indicating the length of the following fields in the attribute, and DFS master support field that indicates whether the NAN device supports DFS master functionality. The DFS master support field may be a single bit that, for example, is set to 1 to indicate support of DFS master functionality as required by the FCC and set to 0 otherwise.

In one embodiment, a DFS information attribute is included in NAN action frames such as data path setup frames, schedule request frames, schedule response frames, and update notification frames. The DFS information attribute may indicate whether a NAN device has a connection/association with a DFS master device and may include the DFS master's MAC address. Examples of such a connection/association with a DFS master include where the NAN device has concurrent operation as a client with an AP (note that every AP is required to support DFS master functionality), where the NAN device has concurrent operation as a peer-to-peer (P2P) client with a P2P Group Owner that supports DFS master functionality, and where the NAN device has NAN data path with another NAN device with DFS master functionality. In the case where the NAN device is listening to a DFS master device, the DFS master's MAC address may be included in the DFS information attribute. In the case where the NAN device is a DFS master or is connected/associated with a DFS master, the DFS channel availability may be included in the DFS information attribute. A country code (CC) may also be included in the DFS information attribute if the NAN device is a DFS master.

FIG. 9 is a table of the sizes, values, and descriptions of the fields of a DFS information attribute according to some embodiments, where the sizes and values of the fields may be as depicted or are to be determined (TBD). An attribute ID field indicates the type of NAN attribute that in this case would indicate a DFS information attribute. A length field indicates the length of the subsequent fields in the attribute. A DFS information entries field lists the DFS information entry fields that are contained in the attribute.

FIG. 10 is a table of the sizes, values, and descriptions of the fields of an example DFS information entry contained in a DFS information attribute according to some embodiments, where the sizes and values of the fields may be as depicted or are to be determined (TBD). A device role field identifies the NAN device's role or status where a 0 value indicates that the device is a DFS Master, a 1 value indicates that the device is associated/connected with a DFS master device, and a 2 value indicates that the device listens to a DFS master device. A MAC address field indicates the MAC Address of the DFS Master device that the NAN address is associated/connected with or is listening to. A DFS channel availability field lists the DFS channels that are available and may be in the form of a bitmap. If the device is a DFS master device, this field may include a set of available DFS channels. If the device is associated/connected with or listening to a DFS master device, this field may only include the DFS channel where the DFS master is operating.

If the NAN device supports DFS master functionality, the committed NAN availability slots in the DFS channels should be updated in real time according to radar detection and DFS master operation rules. In one embodiment, if a NAN device with DFS master functionality detects radar signals, the device sends a schedule update frame (or other NAN action frame) with a DFS information attribute that indicates the removal of the committed NAN availability slots in DFS channels and indicates that DFS channels are not available.

If the NAN device connects/associates or listens to a DFS master, the device may operate in any or all of the following manners with respect to NAN availability slots, where such NAN availability slots may be committed, potential, or conditional NAN availability slots. The NAN availability slots may include any slots in the DFS channels, if the DFS master includes any committed NAN availability slots in the DFS channels. The NAN availability slots may include any slots in the DFS channels, if the DFS master indicate that DFS channels are available. The NAN availability slots may not include any slots in the DFS channels, if the DFS master does not include any committed NAN availability slots in the DFS channels. The NAN availability slots may not include any slots in the DFS channels, if the DFS master indicate that DFS channels are not available. The NAN availability slots in the DFS channels may be the same or a subset of the DFS master's committed availability slots in the DFS channels. In the case where two NAN devices are connected/associated with or listening to a common DFS master, as identified through a common DFS MAC address, the devices may have common committed NAN availability slots in a DFS channel. If a NAN device connects/associates or listens to multiple DFS masters, and if the DFS channels are indicated as unavailable by one of the DFS masters, then the NAN device may not include any NAN availability slots in the DFS channels. If a NAN device connects/associates or listens to a DFS master that is an AP or P2P Group Owner (GO), the committed availability slots may be included in the AP/GO operating channel in the DFS bands, where such committed NAN availability slots are updated accordingly and in real time.

ADDITIONAL NOTES AND EXAMPLES

In Example 1, an apparatus for a wireless station (STA), comprises: memory and processing circuitry, wherein the processing circuitry is to: encode a Neighbor Awareness Networking (NAN) service discovery frame to announce NAN services to peer devices or identify peer devices with which to establish a NAN connection; and, wherein the NAN service discovery frame is encoded to include a device capability attribute with a Dynamic Frequency Selection (DFS) Master flag to indicate whether the STA supports DFS Master functionality.

In Example 2, an apparatus for a wireless station (STA), comprises: memory and processing circuitry, wherein the processing circuitry is to: encode a Neighbor Awareness Networking (NAN) service discovery frame to announce NAN services to peer devices or look for peer devices with which to establish a NAN connection; encode a NAN action frame that includes a DFS information attribute; and, wherein the DFS information attribute has a device status field that indicates whether the STA is a DFS master, is associated with a DFS master, or listens to a DFS master.

In Example 3, the subject matter of any the Examples herein may optionally include wherein the processing circuitry is to: encode a NAN action frame that includes a DFS information attribute; and, wherein the DFS information attribute has a device status field that indicates whether the STA is a DFS master, is associated with a DFS master, or listens to a DFS master.

In Example 4, the subject matter of any the Examples herein may optionally include wherein the NAN action frame is selected from a group that includes a data path setup frame, a schedule request frame, a schedule response frame, and an update notification frame.

In Example 5, the subject matter of any the Examples herein may optionally include wherein the DFS information attribute has an address field that indicates a medium access control (MAC) address of a DFS master that the STA listens to or is associated with.

In Example 6, the subject matter of any the Examples herein may optionally include wherein the DFS information attribute has a DFS channel availability field that indicates an operating DFS channel when the STA listens to or is associated with a DFS master.

In Example 7, the subject matter of any the Examples herein may optionally include wherein the DFS information attribute has a DFS channel availability field that indicates a set of available DFS channels when the STA is a DFS master.

In Example 8, the subject matter of any the Examples herein may optionally include wherein the DFS information attribute has a country code attribute when the STA is a DFS master.

In Example 9, the subject matter of any the Examples herein may optionally include wherein the processing circuitry is to: operate as a DFS master and monitor DFS channels in the 5 GHz band for presence of radar signals; and, if radar signals are detected in the DFS channels, encode a NAN action frame to send to a peer NAN STA with a DFS attribute to indicate that DFS channels are not available.

In Example 10, the subject matter of any the Examples herein may optionally include wherein the processing circuitry is to: operate as a DFS master and monitor DFS channels in the 5 GHz band for presence of radar signals; designate selected slots in a particular DFS channel as committed NAN availability slots when no radar signals are detected; and, if radar signals are detected in the particular DFS channel, encode a schedule update frame to send to a peer NAN STA to remove the committed NAN availability slots.

In Example 11, the subject matter of any the Examples herein may optionally include wherein the processing circuitry is to: operate as a NAN STA that is associated with or that listens to a DFS master; decode a frame from the DFS master that indicates availability of DFS channels; include as committed, potential, or conditional NAN availability slots any slots in the DFS channels if the decoded frame from the DFS master includes any committed NAN availability slots in the DFS channels.

In Example 12, the subject matter of any the Examples herein may optionally include wherein the processing circuitry is to: operate as a NAN STA that is associated with or that listens to a DFS master; decode a frame from the DFS master that indicates availability of DFS channels; include as committed, potential, or conditional NAN availability slots any slots in the DFS channels if the decoded frame from the DFS master indicates that DFS channels are available.

In Example 13, the subject matter of any the Examples herein may optionally include wherein the processing circuitry is to: operate as a NAN STA that is associated with or that listens to a DFS master; decode a frame from the DFS master that indicates availability of DFS channels; include no slots in the DFS channels as committed, potential, or conditional NAN availability slots if the decoded frame from the DFS master indicates that no committed NAN availability slots in the DFS channels are available.

In Example 14, the subject matter of any the Examples herein may optionally include wherein the processing circuitry is to: operate as a NAN STA that is associated with or that listens to a DFS master; decode a frame from the DFS master that indicates availability of DFS channels; include no slots in the DFS channels as committed, potential, or conditional NAN availability slots if the decoded frame from the DFS master indicates that the DFS channels are not available.

In Example 15, the subject matter of any the Examples herein may optionally include wherein the processing circuitry is to: operate as a NAN STA that is associated with or that listens to a DFS master; decode a frame from the DFS master that indicates availability of DFS channels; include as committed, potential, or conditional NAN availability slots those slots in the DFS channels that are the same or a subset of committed NAN availability slots in the DFS channels indicated by the decoded subframe from the DFS master.

In Example 16, the subject matter of any the Examples herein may optionally include wherein the processing circuitry is to: operate as a NAN STA that is associated with or that listens to a plurality of DFS masters; decode a frames from the plurality of DFS masters that indicate availability of DFS channels; include no slots in the DFS channels as committed, potential, or conditional NAN availability slots if unavailability of DFS channels is indicated by the decoded subframe from any one of the plurality of DFS masters.

In Example 17, the subject matter of any of the Examples herein may optionally include a radio transceiver having one or more antennas connected to the processing circuitry.

In Example 18, a computer-readable medium contains instructions to cause a wireless station (STA) or access point (AP), upon execution of the instructions by processing circuitry of the STA or AP, to perform any of the functions of the processing circuitry as recited by any of the Examples herein.

In Example 19, a method for operating a wireless station or access point comprises performing any of the functions of the processing circuitry and/or radio transceiver as recited by any of the Examples herein.

In Example 20, an apparatus for a wireless station or access point comprises means for performing any of the functions of the processing circuitry and/or radio transceiver as recited by any of the Examples herein.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect. An example LTE system includes a number of mobile stations, defined by the LTE specification as User Equipment (UE), communicating with a base station, defined by the LTE specifications as an eNodeB.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to 1/10 of a wavelength or more.

In some embodiments, a receiver as described herein may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the disclosure is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16(m) standards for wireless metropolitan area networks (WMANs) including variations and evolutions thereof, although the scope of the disclosure is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. An apparatus for a Neighbor Awareness Network (NAN) device, the NAN device configurable for dynamic frequency selection (DFS), the apparatus comprising:
 memory and processing circuitry, wherein the processing circuitry is to:
  encode a NAN service discovery frame (SDF) to initiate a NAN operation,
  the NAN service discovery frame encoded to include a device capability attribute bit to indicate whether the NAN device is operating as a DFS master device; and
  if the NAN device is operating as the DFS master device, the processing circuitry is configured refrain from indicating available slots on a DFS channel unless permitted to use the DFS channel.

2. The apparatus of claim 1 wherein the processing circuitry is configured to:
 set the device capability attribute bit to one to indicate that the NAN device is operating as a DFS master device; and
 set the device capability attribute bit to zero otherwise.

3. The apparatus of claim 1 wherein if the NAN device is not operating as the DFS master, the processing circuitry is configured to decode a frame on a DFS channel from the DFS master, the frame to indicate available slots on the DFS channel as committed, potential, or conditional, the frame indicating the available slots when the DFS master is permitted to use the DFS channel.

4. The apparatus of claim 1 wherein if the NAN device is operating as the DFS master, the processing circuitry is configured to encode a frame for transmission on the DFS channel to a peer NAN device that indicates available slots on the DFS channel.

5. The apparatus of claim 4, wherein the available slots are indicated as committed, potential, or conditional.

6. The apparatus of claim 1, wherein if the NAN device is operating as the DFS master device, the processing circuitry is configured refrain from indicating available slots on a DFS channel unless permitted to use the DFS channel based on regulatory requirements.

7. The apparatus of claim 1 wherein the DFS channel in within an unlicensed 5 GHz band.

8. The apparatus of claim 1, wherein the processing circuitry is to configure the NAN device for radar detection in an unlicensed band.

9. The apparatus of claim 1 further comprising a direct conversion mixer, the direct conversion mixer configured to directly downconvert RF signals to baseband signals, wherein the processing circuitry is configured to decode the baseband signals; and
 wherein the memory is to store the SDF frame.

10. The apparatus of claim 1, further comprising a super-heterodyne mixer, the super-heterodyne mixer configured to downconvert RF signals to intermediate frequency signals prior to generation of baseband signals, wherein the processing circuitry is configured to decode the baseband signals; and
 wherein the memory is to store the SDF frame.

11. The apparatus of claim 1 further comprising: mixer circuitry to downconvert RF signal to baseband signals; and
 synthesizer circuitry, the synthesizer circuitry comprising one of a fractional-N synthesizer or a fractional N/N+1 synthesizer, the synthesizer circuitry configured to generate an output frequency for use by the mixer circuitry, wherein the processing circuitry is configured to decode the baseband signals.

12. The apparatus of claim 1 further comprising: mixer circuitry to downconvert RF signal to baseband signals; and
 synthesizer circuitry, the synthesizer circuitry comprising a delta-sigma synthesizer, the synthesizer circuitry configured to generate an output frequency for use by the mixer circuitry, wherein the processing circuitry is configured to decode the baseband signals.

13. A non-transitory computer-readable storage medium that stores instructions for execution by processing circuitry of a Neighbor Awareness Network (NAN) device to configure the NAN device to perform operations for dynamic frequency selection (DFS), the apparatus comprising:
  memory and processing circuitry, wherein the processing circuitry is to:
  encode a NAN service discovery frame (SDF) to initiate a NAN operation,
    the NAN service discovery frame encoded to include a device capability attribute bit to
    indicate whether the NAN device is operating as a DFS master device; and
  if the NAN device is operating as the DFS master device, the processing circuitry is configured refrain from indicating available slots on a DFS channel unless permitted to use the DFS channel.

14. The non-transitory computer-readable storage medium of claim 13 wherein the processing circuitry is configured to:
  set the device capability attribute bit to one to indicate that the NAN device is operating as a DFS master device; and
  set the device capability attribute bit to zero otherwise.

15. The non-transitory computer-readable storage medium of claim 13 wherein if the NAN device is not operating the DFS master, the processing circuitry is configured to decode a frame on a DFS channel from the DFS master, the frame to indicate available slots on the DFS channel as committed, potential, or conditional, when the DFS master is permitted to use the DFS channel.

16. The non-transitory computer-readable storage medium of claim 13 wherein if the NAN device is operating as the DFS master, the processing circuitry is configured to encode a frame for transmission on the DFS channel to a peer NAN device that indicates available slots on the DFS channel.

17. The apparatus of claim 16, wherein the available slots are indicated as committed, potential, or conditional.

18. An apparatus for a Neighbor Awareness Network (NAN) device, the NAN device configurable for dynamic frequency selection (DFS), the apparatus comprising:
  memory and processing circuitry, wherein the processing circuitry is to:
    decode a NAN service discovery frame (SDF) received from another NAN device,
    the NAN service discovery frame indicating that the other NAN device is initiating a NAN operation,
    the NAN service discovery frame including a device capability attribute bit to indicate whether the other NAN device is operating as a DFS master device; and
    decode a frame received from the other NAN device, the frame to indicate available slots on a DFS channel if the other NAN device is permitted to use the DFS channel and not indicate available slots on the DFS channel if the other NAN devices is not permitted to use the DFS channel.

19. The apparatus of claim 18 wherein the device capability attribute bit is set to one to indicate that the other NAN device is operating as a DFS master device and is set to zero otherwise.

20. The apparatus of claim 18 wherein if the other NAN device is operating the DFS master, the processing circuitry is configured to decode a frame on a DFS channel from the other NAN device, the frame to indicate available slots on the DFS channel as committed, potential, or conditional, when the DFS master is permitted to use the DFS channel.

* * * * *